United States Patent
Muller

(10) Patent No.: US 9,079,805 B2
(45) Date of Patent: Jul. 14, 2015

(54) MIXTURES ON THE BASIS OF SULFUR-CROSSLINKED TRIGLYCERIDE, A METHOD FOR THE PRODUCTION THEREOF, AND THE USE THEREOF AS FERTILIZER

(75) Inventor: Helmut Muller, Kitzingen (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 61 days.

(21) Appl. No.: 13/993,728

(22) PCT Filed: Dec. 15, 2011

(86) PCT No.: PCT/EP2011/072937
§ 371 (c)(1),
(2), (4) Date: Jan. 15, 2014

(87) PCT Pub. No.: WO2012/080410
PCT Pub. Date: Jun. 21, 2012

(65) Prior Publication Data
US 2014/0123717 A1    May 8, 2014

(30) Foreign Application Priority Data

Dec. 15, 2010 (EP) .................................... 10195179

(51) Int. Cl.
*C05F 11/00* (2006.01)
*C05G 3/00* (2006.01)

(52) U.S. Cl.
CPC .............. *C05F 11/00* (2013.01); *C05G 3/0041* (2013.01); *C05G 3/0047* (2013.01); *C05G 3/0088* (2013.01)

(58) Field of Classification Search
None
See application file for complete search history.

(56) References Cited

U.S. PATENT DOCUMENTS

| 1,882,377 | A | 10/1932 | Whittelsey |
| 1,910,005 | A | 5/1933 | Gestetner |
| 2006/0000252 | A1 | 1/2006 | Carstens et al. |
| 2007/0180877 | A1 | 8/2007 | Anderson |
| 2012/0111075 | A1* | 5/2012 | Hargrove et al. ................. 71/27 |
| 2012/0111076 | A1* | 5/2012 | Avdala et al. ..................... 71/27 |
| 2012/0111077 | A1* | 5/2012 | Maruvada et al. ................ 71/27 |

FOREIGN PATENT DOCUMENTS

WO    2009010576 A3    1/2009

OTHER PUBLICATIONS

Database EPODOC (online), European Patent Office, the Hague, NL; Sep. 28, 1999, Database Accession No. JP11264791.
European Search Report from co-pending Application EP10195179, dated Feb. 15, 2011, 2 pages.

* cited by examiner

*Primary Examiner* — Wayne Langel

(57) ABSTRACT

The present invention relates to novel mixtures based on sulfur-crosslinked triglyceride, a process for their preparation, and their use as fertilizers, in particular for promoting the growth of plants which require sulfur.

15 Claims, No Drawings

MIXTURES ON THE BASIS OF SULFUR-CROSSLINKED TRIGLYCERIDE, A METHOD FOR THE PRODUCTION THEREOF, AND THE USE THEREOF AS FERTILIZER

The present invention relates to novel mixtures based on sulfur-crosslinked triglyceride, a process for their preparation, and their use as fertilizers, in particular for promoting the growth of plants which require sulfur.

Plant growth requires not only water, carbon dioxide and sunlight, but furthermore the macronutrients nitrogen, potassium and phosphate and secondary nutrients and trace elements. Sulfur, too, is a vital secondary nutrient, especially in the plants' protein synthesis, and is preferentially taken up by them via the root in the form of sulfate.

In the last one to two decades, sulfur depletion has been found in agriculture soils in some regions. This is caused by reduced sulfur emissions as the result of the increased flue gas desulfuration and reduction of the sulfur content in fuels.

A multiplicity of mineral fertilizers is available for sulfur fertilization. They differ mainly in their form (sulfate, elemental 5) and hence the speed of action. In most sulfur-containing mineral fertilizers, sulfur is present in sulfate form. Sulfur in sulfate form is immediately available to the plants. Sulfur in elemental form (for example wettable sulfur) cannot be taken up directly by plants but must first be converted into sulfate by thiobacteria, which, at soil temperatures of <10° C., may be a lengthy process. Moreover, sulfates have the disadvantage of being, as a rule, readily soluble in water, and, as a result, are leached from the soil too rapidly, especially in regions which receive a lot of rainfall, and is therefore available to the plant only within a relatively short period.

DE 102007034278 A describes a mixture of ammonium sulfate as mineral sulfur fertilizer together with lime for avoiding the acidification of the soil as the result of sulfur fertilizers. This, however, does not do away with the disadvantage of the sulfate being leached from the soil unduly rapidly. Faktis, which is made with sulfur monochloride (see DE 545375), in turn, has the disadvantage that it only comprises short sulfur bridges and, disadvantageously, has a high chlorine content. Mercaptan-group-containing triglycerides, as described, for example, in US 2006/0000252, are unsuitable for many applications due to the pronounced high odor.

The task was therefore to provide mixtures which can be employed as efficient fertilizers, are ecologically acceptable and are available to the plant at least over the entire growth period.

Surprisingly, it has now been found that mixtures based on sulfur-crosslinked triglyceride, obtainable by reacting at least one triglyceride and sulfur at temperatures of >150° C., further flow aids and optionally further additives fulfill this task and are a highly effective fertilizer for plants which require sulfur.

An object of the present invention are mixtures, comprising at least one sulfur-crosslinked triglyceride, obtainable by reacting at least one triglyceride and sulfur at temperatures of >150° C., at least one flow aid based on silica, starch and/or metal oxides, and, if appropriate, further additives.

In a preferred embodiment of the invention, the triglyceride is babussa oil, cottonseed oil, borage oil, thistle oil (=safflower oil), groundnut oil, currant seed oil, hazelnut oil, herring oil, wood oil, jojoba oil, coconut oil, neatsfoot oil, bone oil, liver oil, linseed oil, corn oil, almond oil, olive oil, palm kernel oil, rapeseed oil (=colza oil), castor oil, sardine oil, mustard seed oil, soya oil, sunflower oil, shea butter, grapeseed oil and/or walnut oil.

Colza oil, soya oil, sunflower oil and/or castor oil are preferably employed.

In a further preferred embodiment of the invention, mixtures of triglycerides are employed. In these cases, mixtures of colza oil, soya oil, sunflower oil and castor oil are preferred. In these cases, the ratio of the triglycerides to each other may be chosen as desired and is generally determined by the price of the raw materials.

All the abovementioned triglycerides are commercially available and thus available for example from Gustav Heess GmbH & Co KG.

The sulfur-crosslinked triglyceride for the purposes of the invention preferably takes the form of those compounds which are obtainable by reacting at least one triglyceride with sulfur at temperatures of >150° C.

The following preparation process is preferred in this context:

The triglyceride or the mixture of several triglycerides is initially introduced into the reaction vessel, warmed to temperatures of at least 150° C., the sulfur, in the desired amount, is transformed into the liquid aggregate state by warming/melting and added, preferably in portions, to the stirred triglyceride or mixture of several triglycerides; stirring is optionally continued to complete the reaction at temperatures of >150° C.; and the mixture is poured into molds, where it is subjected to thermal conditioning at >120° C. After cooling, it is preferred to comminute the sulfur-crosslinked triglyceride.

All customary commercially available cutting mills, such as, for example, a cutting mill from Pallmann Maschinenfabrik GmbH & Co. KG, may be employed for the comminution process.

In this context, the sulfur is preferably employed in elemental form, especially preferably in the form S8 sulfur.

In a further preferred embodiment of the invention, the sulfur content in the sulfur-crosslinked triglyceride amounts to 10-30% by weight, especially preferably 10-20% by weight, based on the triglyceride.

The content of sulfur-crosslinked triglyceride in the mixture preferably amounts to more than 60%, based on the total mixture. Especially preferred is a content of 90.0% to 99.9%, with the total of all components of the mixture being 100%.

The sulfur-crosslinked triglycerides are commercially available substances which are available for example from Rhein Chemie Rheinau GmbH under the Rhenopren® name.

The flow aids for the purposes of the invention are release agents which are mixed with the comminuted sulfur-crosslinked triglyceride to prevent clumping together of the latter, mainly for the purposes of better suitability for machines and dosability.

The flow aids employed for the purposes of the invention preferably take the form of fumed and/or precipitated silica, obtainable from Evonik Degussa GmbH under the names Sipernat® or Aerosil®, polysaccharides composed of α-D-glucose units as starch, obtainable from Südstärke GmbH under the name Kartoffelstärke Superior, bentonite as a mixture of different clay minerals such as montmorillonite, quartz, mica, spar, pyrite or else calcite, available from S&B Industrial Minerals GmbH under the name IBECO® AGROMONT and/or metal oxides of the elements Mg, Ca, obtainable from Rhein Chemie Rheinau GmbH under the name Rhenofit®.

In this context, the mixtures according to the invention may also comprise further additives and/or may also be combined with customary nitrogen- and/or phosphorus-containing compounds such as, for example, ammonium nitrate and/or diammonium phosphate, or trace elements such as boron, zinc, copper, iron, molybdenum and/or manganese.

These substances take the form of commercially available compounds.

The content of each additive preferably amounts to from 0.0 to 10% of the mixture, with amounts from 0.0 to 1.0% of the mixture being preferred for the trace elements.

The flow aid content preferably amounts to from 0.1-40% by weight, especially preferably 1-5%. These flow aids preferably have a particle size of from 0.5-40.0 µm, especially preferably a particle size of from 0.5-4.0 µm.

In this context, the mixture according to the invention preferably has a particle size of from 0.3-20 mm.

An object of the present invention is also a process for the preparation of the mixture, according to which the sulfur-crosslinked triglyceride is ground and mixed with the flow aid and optionally further additives.

All customary cutting mills such as, for example, the cutting mill from Pallmann Maschinenfabrik GmbH & Co. KG, may be employed for the grinding process.

Grinding is preferably carried out at a temperature of from 30° C. to 50° C. and a throughput of 400-600 kg/h.

Apparatuses which are suitable for mixing are, for example, powder mixers obtained from Maschinenfabrik Gustav Eirich GmbH & Co KG.

An object of the present invention are also fertilizers comprising at least one sulfur-crosslinked triglyceride, at least one flow aid based on silica, starch, bentonite and/or metal oxides and optionally further additives.

Fertilizers are understood as meaning, for the purposes of the invention, substances or substance mixtures which in agriculture and horticulture serve to increase the nutrient supply for the crop plants. In most cases, high yields or more rapid growth may be achieved thereby. In this context, the expression fertilizer comprises mineral, organic and/or organic-mineral fertilizers.

As regards the sulfur-crosslinked triglycerides, the flow aids based on silica, starch, bentonite and/or metal oxides, reference is made to what has been said above.

Additives which can be employed for the purpose of the invention are nitrogen- and/or phosphorus-containing compounds such as, for example, ammonium nitrate and/or diammonium phosphate and/or trace elements such as boron, zinc, copper, iron, molybdenum and/or manganese.

An object of the present invention is also the use of the sulfur-crosslinked triglyceride according to the invention, obtainable by reacting at least one triglyceride and sulfur at temperatures >150° C., as fertilizer and the use of the mixtures according to the invention as fertilizers.

As regards the sulfur-crosslinked triglycerides, the flow aids based on silica, starch, bentonite and/or metal oxides, and the additives, reference is made to what has been said above.

Likewise, an object of the present invention is also the use of the mixtures according to the invention for accelerating the growth of plants which require sulfur.

Plants which require sulfur are preferably Cruciferae such as, for example, oilseed rape and mustard, cereals such as, for example, wheat, corn, sorghum and millet, rye, oats and barley, sugar beet, potatoes, fodder grass stems, cabbages, Liliaceae such as, for example, onions, garlic, leek, chives, hyacinths, and Asparagaceae such as, for example, vegetable asparagus.

The scope of the invention extends to all of the definitions of radicals, indices, parameters and explanations in combination with each other which have been mentioned hereinabove and mentioned hereinbelow in general terms or in preferred ranges, that is to say that any combination between the respective ranges and preferred ranges is also possible.

The examples which follow are intended to illustrate the invention without having any limiting effect.

USE EXAMPLES

1) Two comparison plots of in each case 1 m² on a sandy soil which had not recently been fertilized were planted with onions cv. "Stuttgarter Riesen". The planting distance in the row was approximately 8 cm and the distance between rows approximately 18 cm. After the onions had emerged to a height of 5 cm, the plots were weeded, and plot A was not given any extra fertilizer, while plot B was fertilized with 45 g (approximately 60 kg/ha sulfur) of the mixture according to the invention, comprising sulfur-crosslinked triglyceride based on rapeseed oil with a sulfur content of 14.3% and 2% starch as flow aid.

The entire area was irrigated with 2.0 l water/m² every other day until the end of the growth period.

At the end of the growth period, the onions were harvested and dried in the air for 1 week.

The onions from the comparison plots were weighed and measured.

| Plot | A (comparative, without fertilization) | B [fertilized in accordance with the invention] |
|---|---|---|
| Weight [g] | 48 +/− 7 g | 81 +/− 12 g |
| Diameter | 51 +/− 2 mm | 64 +/− 4 mm |

The test results demonstrate clearly that the yield of the onions which have been fertilized with the mixture according to the invention is nearly twice as high as without fertilization.

2) In another experiment, the varieties "Stuttgarter Riesen" and "Red Baron" were grown on a loamy soil which had not recently been fertilized. Again, 2 comparison plots of in each case 1 m² were planted. The planting distance in the row was approximately 8 cm and the distance between rows approximately 18 cm. After the onions had emerged to a height of 5 cm, the plots were weeded, and plot A was not given any extra fertilizer, while plot B was fertilized with 45 g (approximately 60 kg/ha sulfur) of the mixture according to the invention, comprising sulfur-crosslinked triglyceride based on rapeseed oil with a sulfur content of 14.3% and 2% starch as flow aid.

This time, the experimental plots were not irrigated artificially.

At the end of the vegetation period, the onions were harvested and dried in the air for 1 week.

The onions from the comparison plots were weighed and measured.

| | A (comparative, without fertilization) | B [fertilized in accordance with the invention] |
|---|---|---|
| Plot: Stuttgarter Riesen | | |
| Weight [g] | 67 +/− 6 g | 93 +/− 11 g |
| Diameter | 56 +/− 2 mm | 61 +/− 2 mm |
| Plot: Red Baron | | |
| Weight [g] | 48 +/− 9 g | 76 +/− 15 g |
| Diameter | 43 +/− 4 mm | 52 +/− 4 mm |

The experimental results demonstrate clearly that the yield of the onions fertilized with the mixture according to the invention clearly exceeds the yield without fertilization.

What is claimed is:

1. A mixture comprising:
   at least one sulfur-crosslinked triglyceride produced by reacting at least one triglyceride and sulfur at temperatures of >150° C.;
   at least one flow aid comprising at least one of silica, starch, bentonite, or metal oxides; and
   optionally further additives.

2. The mixture as claimed in claim 1, wherein the triglycerides comprise at least one of babussa oil, cottonseed oil, borage oil, thistle oil, groundnut oil, currant seed oil, hazelnut oil, herring oil, wood oil, jojoba oil, coconut oil, neatsfoot oil, bone oil, liver oil, linseed oil, corn oil, almond oil, olive oil, palm kemel oil, rapeseed oil, castor oil, sardine oil, mustard seed oil, soya oil, sunflower oil, shea butter, grapeseed oil or walnut oil.

3. The mixture as claimed in claim 1 or 2, wherein the sulfur content in the sulfur-crosslinked triglyceride amounts to 10-30%.

4. The mixture as claimed in claim 1 or 2, wherein the flow aid content amounts to 0.1-40%.

5. The mixture as claimed in claim 1 or 2, wherein the mixture comprises further additives.

6. A process for the preparation of the mixture as claimed in claim 1 or 2, the process comprising:
   reacting at least one triglyceride and sulfur at temperatures of >150° C. to produce the sulfur-crosslinked triglyceride;
   comminuting the sulfur-crosslinked triglyceride, and
   mixing the comminuted sulfur-crosslinked triglyceride with the flow aid and optionally further additives.

7. A process for fertilizing plants, the process comprising contacting the plants with the mixture of claim 1.

8. The process according to claim 7, wherein the plants are plants which require sulfur.

9. The process according to claim 8, wherein the plants belong to Cruciferae.

10. A fertilizer, comprising at least one mixture as claimed in claim 1 or 2.

11. A fertilizer comprising:
    at least one sulfur-crosslinked triglyceride; and
    at least one flow aid, wherein the flow aid comprises at least one of silica, starch, bentonite, or metal oxides.

12. The fertilizer according to claim 11, wherein the sulfur-crosslinked triglyceride is produced by reacting at least one triglyceride and sulfur at temperatures of >150° C.

13. The fertilizer according to claim 11, further comprising at least one of or nitrogen containing compounds, phosphorous containing compounds, or trace elements.

14. The fertilizer according to claim 11, wherein the at least one triglyceride is selected from the group consisting of babussa oil, cottonseed oil, borage oil, thistle oil, groundnut oil, currant seed oil, hazelnut oil, herring oil, wood oil, jojoba oil, coconut oil, neatsfoot oil, bone oil, liver oil, linseed oil, corn oil, almond oil, olive oil, palm kernel oil, rapeseed oil, castor oil, sardine oil, mustard seed oil, soya oil, sunflower oil, shea butter, and grapeseed oil, walnut oil, or mixtures thereof.

15. The fertilizer according to claim 11, wherein:
    the sulfur-crosslinked triglyceride has a sulfur content of 10-30%; and
    the fertilizer has a sulfur-crosslinked triglyceride content of 60-99.9% and a flow aid content of 0.1-40%.

* * * * *